Patented May 3, 1927.

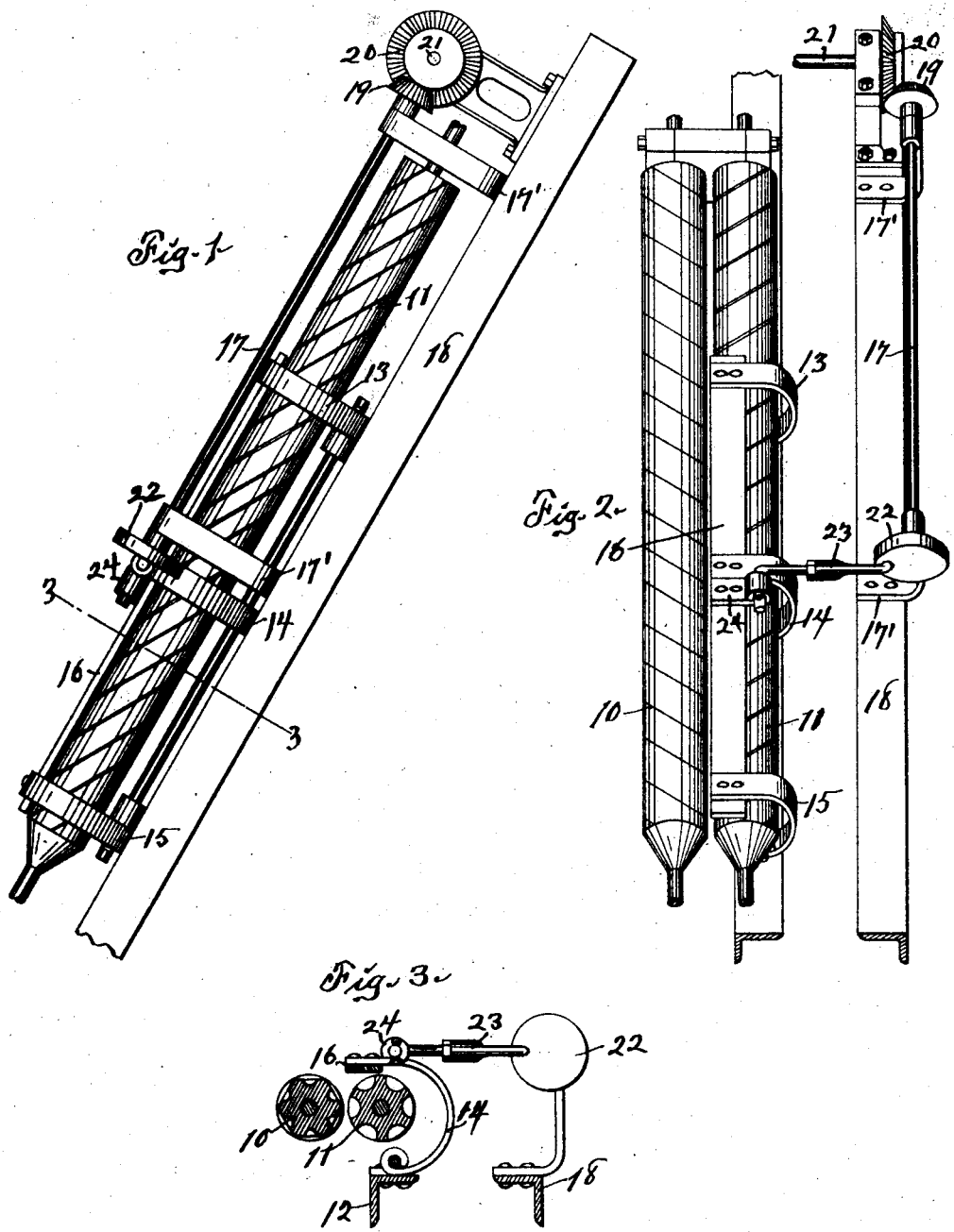

1,627,021

UNITED STATES PATENT OFFICE.

CHARLES DUEKER, OF FORT DODGE, IOWA.

CLEARING DEVICE FOR CORN-SNAPPING MECHANISMS.

Application filed February 8, 1926. Serial No. 86,851.

An object of this invention is to provide improved means, in a corn-snapping mechanism, for knocking ears of corn laterally of the snapping rolls.

A further object of this invention is to provide laterally vibrating devices continuously operated transversely of a snapping roll for the purpose of engaging and knocking ears of corn in one direction only relative to said roll.

A further object of this invention is to provide improved means for driving the operating devices.

A further object of this invention is to provide a guard at one side of the plane of separation of snapping rolls for the purpose of preventing the discharge of ears of corn on that side and directing them to the other side.

My invention consists in the construction, arrangement and combination of elements hereinafter set forth, pointed out in the claims and illustrated by the accompanying drawing in which—

Figure 1 is a side elevation of my improved device. Figure 2 is a front elevation of the same. Figure 3 is a cross section of the same on the indicated line 3—3 of Figure 1.

In the construction of the device as shown the numerals 10, 11 designate snapping rolls mounted for involute rotation and in inclined position in a suitable frame. A frame bar 12 is mounted in inclined position parallel with and spaced from the snapping rolls. A plurality of curved arms 13, 14, 15 are hinged at one end each to the frame bar 12 and extend upwardly and inwardly toward and above the adjacent snapping roll. A guard or knocking bar 16 is fixed to the inner upper ends of the arms 13, 14, 15 and normally occupies a position parallel with, above and adjacent to and substantially two-thirds the length of the snapping roll 11. A shaft 17 is mounted in bearings fixed to another frame bar 18 and is connected by bevel gears 19, 20 of different diameters, to a driving shaft 21 suitably mounted on the frame. A wrist wheel or crank 22 is mounted on one end portion of the shaft 17 and is connected by a pitman 23 with a bearing clip 24 fixed to the central portion of the knocking bar 16. The pitman 23 is made in two sections, one screwing within the other and tightened by a jamb-nut so that it can be lengthened and shortened. When the machine is used in green or wet corn the pitman should be lengthened to cause the knocker bar to extend entirely across the space between the snapping rolls in one extreme of its movement. When the machine is used in dry corn the pitman should be shortened to avoid breaking the corn stalks by contact therewith of the knocker bar.

This invention relates to an improved clearing device adapted for use with snapping rolls employed in corn-harvesting mechanisms to receive and snap ears of corn from stalks standing in a field. Such snapping mechanism forms the subject matter of my Patent No. 1,464,564, issued to me August 14, 1923, and the device herein described is particularly adapted for use with the mechanism described and claimed therein, the snapping rolls 58 and 59 of the above noted patent corresponding with the rolls 11 and 10 respectively as herein illustrated and described. The snapping mechanism is but a part of a complete corn-harvesting machine, which machine includes with other elements a boot and elevator adapted to receive and convey the ears of corn snapped from the standing stalks. Said boot and elevator are preferably mounted on the side of the roll 10 removed from the roll 11 which mounting necessitates the provision of means for directing the snapped ears of corn across the roll 10 and into said boot and preventing said ears from falling across the roll 11. In practical operation the rolls 10 and 11 are mounted in inclined position and engage lower portions of the stalks between their lower forward ends, the involute rotation of said rolls drawing the stalks rearwardly and downwardly therebetween as the machine advances and snapping from said stalks the ears of corn which will not pass between the rolls. It is the function of the bar 16, by reason of its relatively rapid lateral vibration across the roll 11, to strike the snapped ears as soon as separated from their stalks and project said ears across the roll 10 and into the boot mounted for their reception and prevent any and all ears from falling across the roll 11. The bar 16 is shown as of a length less than that of the snapping rolls and sufficient to cover in range only that portion of the stalks on which ears are normally to be found, to the end that the more delicate upper portions of the stalks may not be subjected to the impact of said bar and thereby shattered and destroyed. The shaft 17 is continuously operated, during the operation of the machine, and acts through the crank or wrist wheel 22, pitman 23, and clip 24 to the end of oscillating the bar 16 transversely of the roll 11, such oscillation being permitted by hinging of the carrying arms 13, 14, 15 in a plane below and at one side of the roll 11.

I claim as my invention—

1. In a machine of the character described, curved carrying arms hinged to a suitable support, a bar fixed to said arms and an operating device acting on said bar for lateral vibration thereof.

2. In a machine of the character described having snapping rolls and a frame bar substantially parallel with and spaced therefrom, a guarding and knocking mechanism comprising curved arms hinged to said frame bar, a bar fixed to the free ends of said arms and means for vibrating said bar and arms.

3. In a machine of the character described having snapping rolls, a frame bar adjacent to said snapping rolls and a driving device, a guarding and knocking mechanism comprising arms hinged to the frame bar and extending towards the snapping rolls, a bar fixed to the free ends of said arms adjacent to and above one of said rolls, a countershaft geared to the drive shaft, and connections between said countershaft and bar whereby said bar is vibrated relative to the rolls.

4. In a machine of the character described, curved carrying arms hinged to a suitable support, a bar fixed to said arms, a shaft suitably mounted for rotation and a pitman connecting said shaft with said bar, which pitman is arranged for manual expansion and contraction to vary the stroke thereof.

CHARLES DUEKER.